United States Patent [19]

Chernogorenko et al.

[11] 4,302,249
[45] Nov. 24, 1981

[54] METHOD FOR PROCESSING WASTES RESULTING FROM PRODUCTION OF PHOSPHORUS NAMELY, SLIME AND OFF-GASES, WITH UTILIZATION OF THE RESULTANT PRODUCTS

[76] Inventors: Vasily B. Chernogorenko, ulitsa Ezhena Potie, 11, kv. 86, Kiev; Tleubai M. Alzhanov, ulitsa Poltoratskaya, 18a, kv. 4, Chimkent; Kima A. Lynchak, ulitsa Kaunasskaya, 4, kv. 55; Simon V. Muchnik, Yaroslavov val, 17, kv. 12, both of Kiev; Evgeny S. Ishkhanov, ulitsa Dzhangildina, 8, kv. 22; Vladimir Y. Sergienko, ulitsa Gagarina, 84, kv. 5, both of Chimkent; Vladimir G. Sapian, ulitsa Dekabristov, 37, kv. 30, Vasilkov Kievskoiblasti; Vladimir M. Koverya, ulitsa Bocharova, 8b, kv. 114, Zaporozhie; Mendel E. Pobortsev, ulitsa Vodopyanova, 7, kv. 1, Chimkent; Evgeny A. Markovsky, ulitsa Semashko, 21, kv. 58, Kiev; Valentina V. Dmitrenko, ulitsa 40 let Sovetskoi Ukrainy, 2, kv. 186, Zaporozhie; Vladimir I. Bykov, ulitsa Zaitseva, 22, kv. 83, Leningrad; Alexandr D. Kipchakbaev, ulitsa Uritskogo, 186, kv. 33; Alexandr N. Vopilov, ulitsa Uritskogo, 219, kv. 34, both of Chimkent, all of U.S.S.R.

[21] Appl. No.: 109,297

[22] Filed: Jan. 3, 1980

Related U.S. Application Data

[62] Division of Ser. No. 898,973, Apr. 21, 1978, Pat. No. 4,192,853.

[51] Int. Cl.³ .................................................. C22C 21/14
[52] U.S. Cl. ............................................ 75/143; 75/148
[58] Field of Search .................................. 75/148, 143

[56] References Cited

U.S. PATENT DOCUMENTS

| | | | |
|---|---|---|---|
| 4,053,304 | 10/1977 | Tsuda | 75/148 |
| 4,113,473 | 9/1978 | Gauvry et al. | 75/148 |

Primary Examiner—M. J. Andrews
Attorney, Agent, or Firm—Steinberg & Raskin

[57] ABSTRACT

The method comprises processing slime and off-gases resulting from the production of phosphorus with an aqueous solution of copper sulphate having a concentration of from 15 to 50% at a temperature within the range of from 20° to 80° C. As a result, two products are obtained, i.e. a liquid product and a solid one.

The solid product containing mainly copper phosphide as well as fluorides and chlorides of alkali metals and silicon, and silicates of calcium and aluminium, is used as a modifying and refining agent for hypereutectic silumines and for the manufacture of a copper-phosphorus alloy.

The liquid product containing phosphoric acid, sulphuric acid and copper sulphate is used as starting product for the preparation of a copper-containing fertilizer.

The method according to the present invention makes it possible to modify the production of phosphorus so as to eliminate the formation of secondary wastes and improve the environmental control.

2 Claims, 1 Drawing Figure

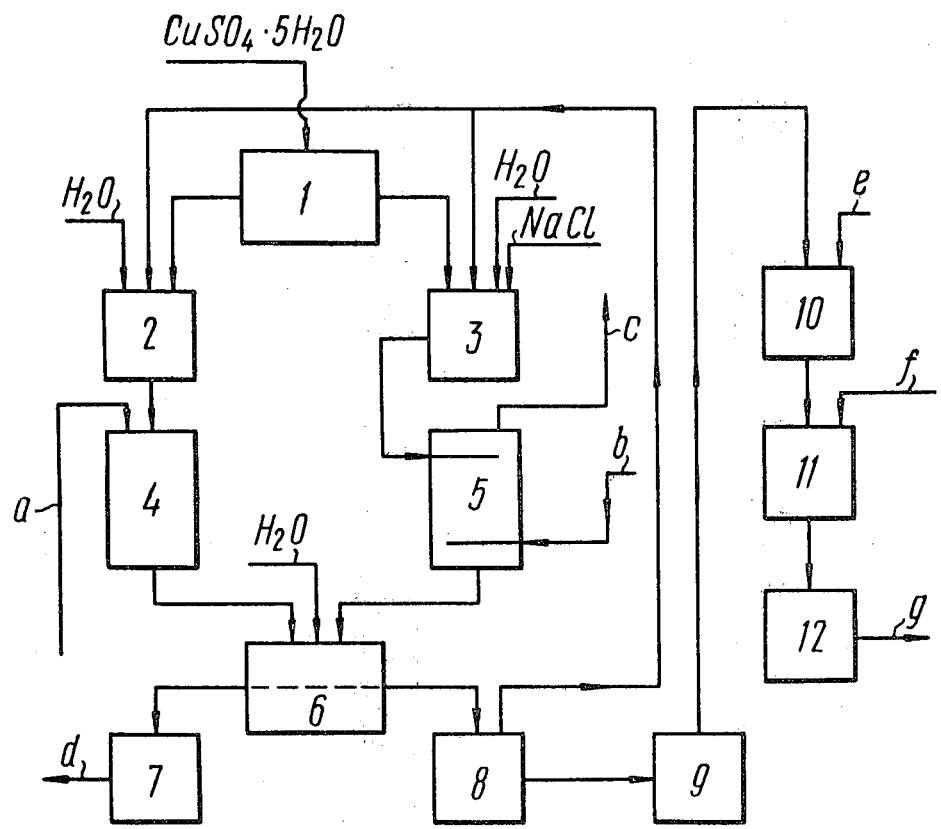

METHOD FOR PROCESSING WASTES RESULTING FROM PRODUCTION OF PHOSPHORUS NAMELY, SLIME AND OFF-GASES, WITH UTILIZATION OF THE RESULTANT PRODUCTS

This is a division of application Ser. No. 898,973, filed Apr. 21, 1978 now U.S. Pat. No. 4,192,853.

FIELD OF THE INVENTION

The present invention broadly relates to environmental control, and, more specifically, to the production of elemental phosphorus; in particular, the present invention relates to methods of processing of wastes resulting from the production of elemental white (yellow) phosphorus, namely, slime and off-gases, with the utilization of the obtained products.

In the production of elemental phosphorus by way of thermal reduction of phosphate materials, by means of carbonaceous reducing agents in the presence of silica, wastes are formed, such as ferrophosphorus, slag, slime, off-gases, Cottrell dust and phosphorite fines.

Ferrophosphorus is used mainly in metallurgy and in the production of building and construction materials. Depending on the starting stock and conditions of the process of phosphorus manufacture, up to 0.7% of elemental phosphorus is entrained with the off-gases and up to 8% of elemental phosphorus is lost with the slime. The off-gases contain in percent by volume: $H_2$, up to 1.3; CO, up to 90; $CO_2$, up to 5; $H_2S$, up to 0.9; poisonous gas phosphine $PH_3$, up to 0.4, as well as vapours or fine particles of phosphorus.

Though calorific power of the off-gases is as high as 3,000 kcal/m$^3$, said off-gases cannot be used, without purification, as a fuel, since phosphine and phosphorus particles contained therein cause corrosion of the metal of heating units. For this reason, only a portion of the off-gases is used for dehydration, decarbonization of phosphorites and for heating of electrostatic precipitators. The major portion of the off-gases is combusted over the stack as a torch, thus polluting the environment with phosphorus oxides and, in the case of presence of humidity in air, with phosphorus acids.

Another waste product resulting from the manufacture of elemental phosphorus is slime. Phosphorus slime is a chemico-mechanical colloidal system consisting of substances based on oxides of alkaline-earth metals and silicon fluorides and chlorides thereof, oxides of aluminium and calcium, fine-dispersed carbon and the like, strongly bonded with phosphorus into aggregates (micelles) by absorption forces of cohesion. The slime composition depends on the nature of the starting stock employed for the production of phosphorus, as well as the technological parameters of the process. Phosphorus slimes may be classified as "thin" and "thick" ones. A "thin" slime contains up to 35% of phosphorus as calculated for the dry solids. This slime is a dark-brown viscous non-uniform mass.

Known in the art are certain methods for processing of "thick" slimes. As to "thin" slimes, these are collected, as a rule, because of the absence of inexpensive and efficient processing methods, in slime-collectors which occupy large areas, pollute the environments and are rather fire-hazardous. In certain cases, in order to avoid pollution of the environment, slimes with a small content of phosphorus are discarded into abandoned mines.

Another waste product resulting from the manufacture of elemental phosphorus is Cottrell dust deposited on electrostatic precipitators upon passing of the flue-gases therethrough. This dust contains up to 22% by weight of $P_2O_5$ and sometimes up to 15% by weight of $K_2O$. The use of this dust as a fertilizer is not always possible, since it contains particles of elemental phosphorus. For this reason, the Cottrell dust is discarded from the electrostatic precipitators into a bin and then into a tank with water, wherein it forms so-called Cottrell milk which is then processed by conventional methods. Particularly, Cottrell dust may be returned to the furnace as a component of the charge. In many cases it is economically efficient to discard the Cottrell dust into refuse dumps, but this results in environment pollution.

Still another waste product resulting from the manufacture of phosphorus and formed in grinding of the starting stock, i.e. phosphorite, is phosphorite fines. As a rule, a small-size fraction screened upon crushing is agglomerated or briquetted, which involves additional costs. In certain cases it is more efficient, from the economic considerations, to discard the fines back into the pit, wherein phosphorite is extracted. This, however, also results in environment pollution.

BACKGROUND OF THE INVENTION

Known in the art are numerous methods for processing of phosphorus slime. Mostly used now are methods contemplating combustion of slimes at the temperature of 1,000° C. Used for combustion are slimes with a content of phosphorus of at least 50% by weight. Slimes containing 15 to 50% by weight of phosphorus are processed by distillation. Distilling-off of phosphorus is effected by means of superheated steam at a temperature within the range of from 160° to 175° C. under a pressure of from 6 to 8 atm. Known methods for processing of "thin" phosphorus-containing slimes by distillation, filtration, centrifugation or briquetting feature low efficiency, necessitate high expenses for their commercial implementation and cannot provide for utilization of all the products involved in the processing.

Known in the art are also methods for breaking slimes by means of inorganic salts and acids. Thus, U.S. Pat. No. 3,515,515 teaches breaking of slime at a temperature of from 40° to 70° C. by means of water-soluble compounds of hexavalent chromium, i.e. chromates and bichromates of metals, and sulphuric acid. The method contemplates the use of a solution of chromates with a concentration of from 0.1 to 10.0% by weight as calculated per chromic acid. Sulphuric acid is added to chromic acid at the ratio of 1:1.

Another U.S. Pat. No. 3,442,621 teaches processing of slime with chromic acid in a concentration of from 0.1 to 10.0% by weight of water in the slime and with hydrochloric acid or sulphuric acid in a concentration of from 1 to 30% by weight of water in the slime.

Upon the action of reagents, the protective film stabilizing the slime particles is oxidized and the slime structure is broken.

As a result, pure yellow phosphorus is obtained along with a small amount of phosphoric acid and a solid residue. The resulting pure phosphorus is collected and combusted by a conventional method to give phosphoric acid.

These prior art methods, however, have the following disadvantages: formation of substantial amounts of liquid wastes containing a suspension of solid particles, weak phosphoric and sulphuric acids, chromium salts or chromic acid; pollution of the environment with the accumulated liquid wastes; high cost of chromium compounds employed in the process and irrevocable losses thereof.

German Democratic Republic Pat. No. 54677 of Mar. 20, 1967 teaches the treatment of a phosphorus slime with an alkali. In doing so, about 30% of phosphorus contained in the slime is converted to a poisonous gas phosphine, while the remaining part of phosphorus remains in the form of a black, strongly contaminated phosphite solution ($Na_2NPO_3$). This prior art method has a disadvantage residing in the formation of large amounts of phosphine which should be further entrapped, as well as the formation of solid and liquid wastes polluting the environment. While effective methods exist for processing of "thick" slimes, there are still no such methods for processing of "thin" slimes.

Known in the art are numerous methods for processing the off-gases resulting from the manufacture of phosphorus by way of trapping phosphine therefrom by using various absorption solutions. These absorption solutions contain $CuCl$, $FeCl_2$, $HCl$, $HgCl_2+HCl$, $H_2SO_4+Na_2Cr_2O_7$, $H_2SO_4+(NH_4)_2SO_4$, $NaClO_2+Cl_2$, $NaClO_2$+bleaching powder; $HNO_3$; $HNO_3+AgNO_3$; $AsCl_3$, $FeCl_3$, $KMnO_4$ and the like.

U.S. Pat. No. 2,673,885 teaches a method for purification of the gases in a counter-current scrubber, which comprises washing of the gases with chlorinated water containing 0.3 to 1 g/l of chlorine.

Among the above-mentioned absorption solutions such solutions as $CuCl$, $FeCl_2$, $HCl$, $HNO_3$, $FeCl_3$ have a small absorption capacity with respect to phosphine. Solutions containing $HgCl_2+HCl$, $AsCl_3$ or $NaClO_2+$ bleaching powder are poisonous or evolve a poisonous gas, i.e. chlorine. The solution containing $HNO_3+AgNO_3$, though quite efficient, is rather expensive.

The products obtained with the use of said solutions do not find any use, they are discarded as wastes and pollute the environment.

Despite a great number of patents and other publications in the art there are no cheap, effecive methods for processing or "thin" slimes and off-gases resulting from the manufacture of phosphorus which would make full utilization of all the products of such processing. Also, there are no cheap methods for utilization of Cottrell dust or phosphorite fines. For this reason, at the present time processing of "thin" slimes, entrapping of phosphine and phosphorus particles from off-gases, a more rational utilization of Cottrell dust and phosphorite fines constitute an urgent but still unsolved problem.

OBJECTS OF THE INVENTION

It is the main object of the present invention to protect the environment from pollution with harmful wastes resulting from the production of elemental phosphorus.

It is another object of the present invention to provide a method for processing of wastes resulting from the production of phosphorus which would make it possible to simultaneously convert to useful products both slime and the off-gases.

Still another object of the present invention is to provide a method for processing slimes and the off-gases resulting from the production of phosphorus which would make it possible to substantially eliminate waste products.

It is a further object of the present invention to provide such a method for processing of wastes resulting from the production of phosphorus which would make it possible to make use of Cottrell dust and phosphorite fines to give a useful product.

It is still further object of the present invention to provide a method enabling processing, to useful products, of "thin" slimes, i.e. slimes containing phosphorus in an amount below 35% by weight.

It is an object of the present invention to ensure utilization of all the products resulting from said processing of slimes and off-gases from the production of phosphorus.

SUMMARY OF THE INVENTION

In accordance with the present invention, the method for processing of wastes from the production of phosphorus, i.e. slime and off-gases, comprises treatment of said wastes with an aqueous solution of copper sulphate, followed by separation of a solid product containing mainly copper phosphide as well as fluorides, chlorides of alkali metals and silicon, calcium and aluminum silicates, from a liquid product containing phosphoric and sulphuric acids and copper sulphate which are utilized.

In accordance with the present invention, copper sulphate concentration in the solution is varied within the range of from 15 to 50% by weight, depending on what is treated, i.e. slime or the off-gas.

It is advisable to use, for the slime processing, an aqueous solution of copper sulphate with a concentration of from 30 to 50% by weight, since within this range most efficient processing conditions are ensured. At concentrations of the copper sulphate solution above 50% by weight the resulting solid residue entrains too much copper ions. This causes difficulties during washing of the residue with pure water and necessitates a high consumption rate of pure water. With concentrations of the solution of copper sulphate below 30% by weight, large volumes of water are required for processing of the slime; in addition, the process duration is increased. Taking into account these factors, optimal concentrations of copper sulphate for processing of the slime are concentrations varied within the range of from 30 to 50% by weight.

For processing of the off-gases it is advisable to use aqueous solutions of copper sulphate with a concentration of from 15 to 20% by weight containing an additive of chlorides of an alkali metal or ammonium, or fluorides, bromides or iodides of an alkali metal. It is preferable that said additive be used in an amount of from 0.5 to 1% by weight.

Upon introduction of chlorides of lithium, potassium, sodium or ammonium into said solution, entrapping of phosphine and phosphorus particles from the off-gas is increased up to 93–95% of their content in said off-gas. Fluorides, bromides or iodides of the same metals act in the same manner, but it is preferable to used chlorides of sodium and ammonium, since those are cheaper and more readily available. The presence of said additive in the solution of copper sulphate accelerates the formation of a solid precipitate during the treatment of the off-gases. Where a solution of copper sulphate is used without used additive, a solid precipitate is formed 30–40 minutes after the start of the treatment, whereas in the presence of said additives a solid precipitate is formed already after 15 minutes after the start of the treatment. It is likely that said additives act as a catalyst.

As far as the solution of copper sulphate intended for processing of the slime is concerned, there is no necessity of introducing said additive thereinto, since the solid phase of the slime already contains a sufficient amount of fluorides and chlorides of an alkali metal (2 to 8% by weight) which act as a catalyst. The process of treatment of the slime and off-gases by means of a solution of copper sulphate is conducted at a temperature within the range of from 20° to 80° C. It is within this particular range that the best results are attained. Though the process can be conducted at a temperature above 80° C., this is undesirable due to difficulties associated with filtration and discharging of the solid product, since the envolving vapour is detrimental for the sanitary and hygienic conditions of labour. It is undesirable to conduct the process at a temperature below 20° C., though it is quite possible, because the processing time is increased.

Phosphorus and phosphine contained in the off-gases as well as phosphorus contained in the slime react with the solution of copper sulphate according to a complicated multi-stage mechanism. In a generalized form this interaction may be characterized by the reactions:

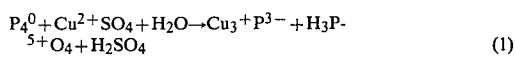

(1)

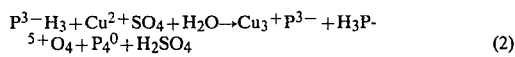

(2)

As a result of reaction (1) and (2) copper phosphide $Cu_3P$ is formed which is the principal compound of the solid product.

Therewith, into the solid product those solid inorganic components are passed without any changes which are contained in the off-gases and slime, i.e. fluorides and chlorides of alkali metals and silicon, calcium and aluminium silicates, carbon black. Said compounds in the solid product are determined by X-ray analysis, crystalooptic analysis, metallographic and chemical analyses.

In accordance with the present invention, processing of the slime and the off-gases resulting from the production of phosphorus by means of an aqueous solution of copper sulphate is accompanied by the formation of two useful products, i.e. a solid product and a liquid one.

The solid product contains mainly cuprous phosphide, and a certain amount of fluorides, chlorides of an alkali metal and of silicon; silicates of calcium and aluminium, while the liquid product contains acid, phosphoric acid and copper sulphate.

The present invention provides for utilization of said products. It has been found that said solid product can be successfully employed as a modifying agent and rafination agent for posteutectic silumines. It should be noted in this respect that the product is used without any additional purification. Furthermore, the solid product can be used for the manufacture of a copper-phosphorus alloy.

The liquid product may be used for the manufacture of a valuable copper-containing potassium-phosphorus fertilizer.

The present invention makes it possible to conduct the processing of wastes from the production of phosphorus, i.e. slime and off-gases, without the formation of secondary wastes. In other words, the method according to the present invention makes it possible to transform the production of phosphorus to a wasteless production which is advantageous from the point of view of environment protection and which is the main merit of the present invention.

The method for processing of wastes resulting from the production of phosphorus in accordance with the present invention is rather simple, economically efficient, does not require high rates of power consumption, and does not require expensive reagents; neither does it required any special equipment.

The method according to the present invention stipulates utilization of all the resulting products with simultaneous utilization of other wastes resulting from the production of phosphorus, such as Cottrell dust and phosphorite fines. All this in itself makes the method according to the present invention commercially profitable compared to the prior art methods for processing of wastes resulting from the production of phosphorus.

These and other advantages of the present invention will be now more fully apparent from the following detailed description.

DETAILED DESCRIPTION OF THE INVENTION

A detailed description of the present invention is given hereinbelow with reference to the accompanying drawing, wherein a principal scheme of processing of wastes from the production of phosphorus is shown which illustrates the treatment of the slime and off-gases into useful products.

Copper sulphate is fed from bin 1 into tanks 2 and 3, into which water is also supplied. In said tanks 2 and 3 a solution of copper sulphate of a required concentration is prepared under stirring. The resulting aqueous solution of copper sulphate from the tank 2 is passed into a reactor 4, while from the tank 3 the solution is fed into an absorber 5 provided with a sphere-type packing. Into the reactor 4 the slime is fed via the line "a", while into the absorber 5 the off-gas is passed via the line "b" counter-currently with respect to the solution.

In the reactor 4 copper sulphate reacts, under stirring, with the slime components to give a liquid product and a solid one. The solid product contains mainly copper phosphide as well as metallic copper, cuprous phosphate, cupric and cuprous oxides, fluorides and chlorides of alkali metals and silicon, calcium and aluminium silicates, and carbon black. The liquid product contains phosphoric acid, sulphuric acid and a certain amount of cuprous sulphate.

In the absorber 5 copper sulphate reacts with the off-gas components which results in the formation of the solid and liquid products. The solid product contains mainly copper phosphide as well as metallic copper, cuprous phosphate, cupric and cuprous oxides, carbon black, fluorides and chlorides of an alkali metal and silicon, calcium and aluminium silicates. The latter pass into the solid product from the dust contained in the off-gas. The liquid product contains phosphoric acid, sulphuric acid and a certain amount of copper sulphate. The off-gases purified from phosphine, phosphorus and dust are evacuated from the absorber 5 via the line "c" and employed as a fuel or as the starting stock for the manufacture of a crude solid carbon dioxide.

The pulp consisting of the solid and liquid products is fed, from the reactor 4 and absorber 5, onto a filter 6, wherein these products are separated; the solid residue is washed with water and delivered into a bin 7, from which it is discharged via the line "d". After drying, the solid product is of a commercial grade and is delivered to a user.

The filtrate resulting after separation of the solid phase is delivered from the filter 6 into a collector 8, from which it is fed into the tanks 2 and 3 for a repeated use, i.e. for dissolution of a fresh portion of copper sulphate. As a result of the repeated use of the liquid product, the concentration of phosphoric acid and sulphuric acid therein is increased. After a repeated use the liquid is collected in a collector 8 and delivered to a vessel 9.

In the vessel 9 the liquid product, when required, is adjusted so as to obtain a copper-containing potassium-phosphorus fertilizer therefrom. From the vessel 9 the liquid product is delivered to a tank 10, into which Cottrell dust is fed via the line "e" under stirring. (This is the dust which is deposited on electric filters upon passing of gases therethrough and contains up to 22% by weight of $P_2O_5$ and up to 15% by weight of $K_2O$). The resulting pulp from the tank 10 is delivered into a mixer 11, wherein it is mixed with the phosphorite flour supplied via the line "f". The phosphorite flour may be prepared from phosphorite fines which is a waste product from crushing of phosphorite ores and which, as a rule, is not processed but discarded, thus polluting the environment. The mass produced in the mixer 11 is delivered to a storage 12, wherein it is kept for 15 to 20 days for maturation. The thus-obtained product from the storage 12 is discharged via the line "g" and further subjected to a treatment similar to that employed for matured superphosphate. As a result, a copper-containing potassium-phosphorus fertilizer is obtained. The gases containing $SiF_4$, HF, $CO_2$ are delivered from the apparatus 10, 11, 12 to the common system of purification from fluorine and compounds thereof (not shown).

Therefore, the liquid product resulting from processing of slimes and off-gases in accordance with the present invention is used along with other wastes from the production of phosphorus, i.e. Cottrell dust and phosphorite flour to yield a fertilizer containing copper and potassium. This fertilizer is a valuable fertilizer for numerous plants growing on peaty soils. In this manner the liquid product is completely employed.

As has been mentioned hereinbefore, the solid product can be used as a modifying and refining agent for hypoeutectic silumines. Hypereutectic silumines are aluminium alloys containing silicon in an amount of more than 11.6% by weight. The modification-and-refining process is performed in the following manner. A hypereutectic silumine is melted at a temperature within the range of from 820° to 900° C. and 0.4 to 0.8% by weight of said solid product is added thereto at this temperature. Therewith, modification and refining of the alloy occurs. This may be further illustrated by the following.

Copper phosphide contained in the solid product reacts with aluminium with the formation of a large number of seeds AlP according to the reaction:

$Cu_3P + Al \rightarrow AlP + CuAl_2$ (3)

the seeds of AlP serve as crystallization centers for silicon grains which would be smaller than grains of silicon crystallized without the seed of AlP.

Then, chlorides and fluorides of alkali metals and silicon, including $Na_2SiF_6$ and $Na_2SiCl_6$ contained in the solid product for gaseous fluorides and chlorides at a temperature of from 820° to 900° C. which, evolving from the melt, contribute to its refining. The decomposition occurs in accordance with the reactions as follows:

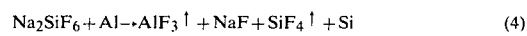

$Na_2SiF_6 + Al \rightarrow AlF_3 \uparrow + NaF + SiF_4 \uparrow + Si$ (4)

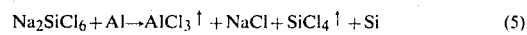

$Na_2SiCl_6 + Al \rightarrow AlCl_3 \uparrow + NaCl + SiCl_4 \uparrow + Si$ (5)

The remaining components of the solid product do not take part in the reactions and come up to the metal surface as a slag. The modified and refined silumine is further employed for the manufacture of foundry articles (such as pistons of internal-combustion engines).

Besides, said solid product can be used for the production of a copper-phosphorus alloy. To this end, the solid product is melted at a temperature within the range of from 1,050° to 1,150° C. in an inert medium. Two layers are formed therewith, namely: the upper and lower ones. The lower layer comprises a melt of copper and phosphorous (phosphorus content is 7 to 13%) which is easily poured into crystallization moulds. The upper layer comprises a slag which is in the form of a glass-like substance containing fluorosilicates of metals and can be used as a flux of soldering or melting of non-ferrous metals.

For a better understanding of the present invention some specific Examples are given hereinbelow with reference to the accompanying drawing; Examples 1 to 5 illustrate the method of processing the slime and off-gases of the production of phosphorus, while Examples 6, 7 and 8 illustrate utilization of the resulting products.

EXAMPLE 1

This Example illustrates processing of the slime resulting from the production of phosphorus along with the preparation of useful products.

In a tank 2 at the temperature of 20° C. there are prepared 100 liters of a 40% solution of copper sulphate. From the tank 2 the solution is delivered into a reactor 4, into which under constant stirring there are added 10 l of a phosphorus slime with the specific gravity of 1.25 and with the following composition in percent by weight: P 25.0; total F+Cl 5.3; total $SiO_2 + Al_2O_3 + + Fe_2O_3$ 35.9; CaO 4.9; MgO 0.5; C 2.1; $Na_2O$ 0.8; $K_2O$ 1.0; water being the balance. As a result of interaction between the reagents two products are formed, i.e. a liquid product and a solid one which are separated in a filter 6. The solid product is washed on the filter and delivered into a bin 7 for the final solid product, while the liquid product is collected in a collector vessel 8. The weight of the resulting solid product is equal to 12.5 kf; it contains in percent by weight: P 13.3; Cu 55.0; total F+Cl 6.1; Si 2.2; Al 1.2; total Na+K 1.2; total Ca+ Mg 3.4, C 1.1; $O_2$ being the balance. Phase analysis of the solid products has shown the presence of the following phases, namely: copper phosphide $Cu_3P$. copper phosphate, metallic copper, cuprous oxide, cupric oxide, fluorides and chlorides of sodium, potassium and silicon silicates of calcium and aluminium, carbon black. The product comprises a black or dark-brown powder.

The liquid product contains 40 g/l of $H_3PO_4$, 300 g/l of $H_2SO_4$ and 2.8 g/l of $Cu^{2+}$ ion. This liquid product from the collector vessel 8 is again delivered to the tank 2 for dissolution of a new portion of copper sulphate to treat another portion of the phosphorus slime. After separation of the solid product, the filtrate repeatedly produced in the collector vessel 8, i.e. liquid product, contains 105 g/l of $H_3PO_4$, 550 g/l of $H_2SO_4$ and 3.2 g/l of $Cu^{2+}$ ions.

The results illustrating processing of the slime with a solution of copper sulphate at various temperatures and concentrations are given in Table 1 hereinbelow.

TABLE 1

Composition of solid and liquid products resulting from processing of slime with the specific gravity of 1.25 (25% of phosphorus) with copper sulphate solution

| Temperature, °C. | Concentration, % | Process duration minutes | Solid product, % P | Cu | Liquid product, g/l $H_3PO_4$ | $H_2SO_4$ |
|---|---|---|---|---|---|---|
| 20 | 40 | 35 | 13.3 | 55 | 40 | 300 |
| 40 | 40 | 25 | 12.0 | 68 | 82 | 320 |
| 70 | 40 | 15 | 10.8 | 70 | 125 | 310 |
| 80 | 40 | 10 | 8.6 | 79 | 160 | 320 |
| 40 | 20 | 60 | 10.7 | 58 | 42 | 175 |
| 40 | 30 | 30 | 11.2 | 62 | 58 | 259 |
| 40 | 40 | 25 | 12.0 | 68 | 82 | 320 |
| 40 | 50 | 40 | 11.7 | 60 | 126 | 460 |
| 40 | 60 | 65 | 11.3 | 62 | 140 | 580 |

It follows from Table 1 that the duration of the interaction of the solution of copper sulphate and the slime is lowered with increasing temperature. Therewith, the major part of phosphorus from the slime is passed into the liquid product in the form of phosphoric acid which results in an increased yield thereof. The amount of phosphorus in the solid phase is reduced. The temperature for the slime processing is selected depending on what product is to be obtained in a larger quantity. Thus, if it is desired to obtain a greater amount of phosphoric acid in the liquid product, then the slime processing should be conducted at a temperature within the range from 70° to 80° C. At temperatures below 20° C. it is undesirable to perform processing of the slime, since the process duration would be rather along. Furthermore, at low temperatures $CuSO_4.5H_2O$ is sparingly soluble.

It also follows from Table 1 hereinbefore that processing of the slime can be performed by means of a solution of cuprous sulphate in concentrations above 50% (60% solution) with equally good results. However, a concentration of the solution above 50% is undesirable due to the fact that the solution becomes very saturated and this has a detrimental effect upon the proceeding time (which is increased) and washing of the solid product from copper ions (which are difficult to wash-off). At a 20% concentration of copper sulphate the process duration is 60 minutes instead of 30 minutes for a 30% solution. Increased duration of the process results in a lesser output from the reactor 4. Reduced concentration of the solution below 30% results in an increased consumption of water. For the above-mentioned reasons, optimal concentrations of the solution of copper sulphate for processing of the slime should be varied within the range of from 30 to 50% by weight.

EXAMPLE 2

This Example illustrates processing of the off-gases resulting from the production of phosphorous with the preparation of useful products. In a tank 3 at the temperature of 40° C. there are prepared 100 l of an aqueous solution of copper sulphate with the concentration of 20% by weight containing 0.5% by weight of sodium chloride. From the tank 3 the solution is passed into an absorber 5 with a sprayed suspended spherical packing. From the lower part of absorber 5 the off-gas is fed counter-currently to the solution stream via the line "b". The off-gas composition is varied within the following range in percent by volume: CO 83-89, H 0.9-4; $CO_2$ 1-3; $H_2S$ 0.4-0.8; phosphine $PH_3$ 1-1.5 g/sm³, amount of phosphorus particles 1-4 g/sm³; supply rate of the off-gas is 4.000 m³/hr. Total phosphorus content in the gas samples taken before and after passing thereof through the absorber 5 is determined by chemical analysis; the content of phosphine is determined chromatographically. According to data obtained from these analyses, upon passing the off-gases of the above-mentioned composition through said solution of copper sulphate at the temperature of 40° C. the solution entraps 93% of phosphine and 90% of phosphorus particles.

As a result of interaction of the gas components with the solution of copper sulphate there are formed solid and liquid products which are separated in a filter 6. The solid product is fed into a bin 7, while the liquid product into a collector vessel 8. The solid product has the following composition in percent by weight: P 9.9; Cu 75.2; total F+Cl; 3.2; Si 4.2; Al 0.5; total Na+K 0.1, total Ca+Mg 1.4; C 0.3; $O_2$ being the balance.

The liquid product, after a single passage through the absorber 5, contains 40 g/l of $H_3PO_4$, 180 g/l of $H_2SO_4$, 170 g/l of $CuSO_4$. From the collector vessel 8 the liquid product is passed into the tank 3, wherein its composition is corrected (adjusted) to the 20% concentration of copper sulphate, though without sodium chloride. From the tank 3 the solution is again passed into the absorber 5. After a repeated cycle of the process of treating the off-gas, the liquid product has the following composition: 75 g/l of $H_3PO_4$, 270 g/l of $H_2SO_4$ and 190 g/l of $CuSO_4$. Upon a repeated treatment of the off-gas with the solution the latter entraps 91% by weight of phosphine and 89% by weight of phosphorus particles. Therefore, the solution of copper sulphate with the addition of 0.5% of sodium chloride substantially totally catches phosphine and phosphorus particles.

The gases purified from phosphine and phosphorus are withdrawn from the absorber 5 via the line "c" and used as a fuel.

EXAMPLE 3

This Example is given to illustrate selection of an optimal concentration of the solution of copper sulphate with the addition of 0.5% of sodium chloride for catching phosphine and phosphorus particles from the off-gases. The process is conducted as described in the foregoing Example 2. Use is made of solutions with the concentration of 10, 15, 20 and 25% by weight of copper sulphate respectively with the addition of 0.5% of sodium chloride at the temperature of 40° C. The results obtained have shown that the optimal concentration of copper sulphate in the solution for the treatment of the off-gases is 15 to 20% by weight. The data thus-obtained are shown in Table 2 hereinbelow.

TABLE 2

Relationship between the amount of entrapped phosphate and phosphorus particles from the off-gasses vs. the concentration of copper sulphate

| Concentration of copper sulphate in the solution, percent by weight | percentage of entrapping | |
|---|---|---|
| | phosphine | phosphorus |
| 10 | 88 | 86 |
| 15 | 92 | 91 |

TABLE 2-continued

Relationship between the amount of entrapped phosphate and phosphorus particles from the off-gasses vs. the concentration of copper sulphate

| Concentration of copper sulphate in the solution, percent by weight | percentage of entrapping | |
|---|---|---|
| | phosphine | phosphorus |
| 20 | 92 | 89 |
| 25 | 85 | 82 |

EXAMPLE 4

This Example is given by way of illustration of the incorporation of additives of alkali metal halides or ammonium into the solution of copper sulphate. The process is conducted in a manner similar to that described in the foregoing Example 2. Into a 20% solution of copper sulphate at the temperature of 40° C. are added 1% additives of chlorides of alkali metals, ammonium as well as bromides, fluorides and iodides of an alkali metal. The results obtained have shown that the addition of chlorides, fluorides, bromides and iodides of an alkali metal or ammonium enhance the absorption capacity of the solution of copper sulphate which makes it possible to effectively purify the off-gas. The data illustrating this processing of the off-gas are shown in Table 'hereinbelow.

TABLE 3

Relationship between entrapping of phosphine and phosphorus particles from the off-gasses vs. the nature of additive

| Additive taken in the amount of 1% by weight | Percentage of entrapping | |
|---|---|---|
| | phosphine | phosphorus |
| LiCl | 95 | 91 |
| KCl | 92 | 94 |
| NaCl | 94 | 92 |
| NH$_4$Cl | 93 | 95 |
| KBr | 86 | 89 |
| KJ | 89 | 90 |
| NaF | 92 | 93 |

It is obvious that halides of other alkali metals will have the same or similar effect, but they are rather expensive as are fluorides, bromides and iodides of metals. For this reason, it is preferable to use chlorides of alkali metals and ammonium.

EXAMPLE 5

This Example is given by way of illustration of the effect of the quantity of chlorides of sodium and ammonium in the solution of copper sulphate on the absorption of phosphine and phosphorus particles from the off-gases. The process is conducted in a manner similar to that described in Example 2 hereinbefore. As a solution for absorption of phosphine use is made of a 20% solution of copper sulphate with the addition of sodium chloride or ammonium chloride taken in different amounts. The data obtained are shown in Table 4 hereinbelow.

TABLE 4

Relationship between absorption of phosphine and phosphorus particles from the off-gases vs. concentration of the additives

| Additive, per cent by weight | | Percentage of entrapping | |
|---|---|---|---|
| | | phosphine | phosphorus |
| NaCl | 0 | 59 | 69 |
| | 0.1 | 82 | 89 |
| | 0.5 | 93 | 90 |
| | 1.0 | 94 | 92 |
| | 2.0 | 94 | 92 |
| | 5.0 | 93 | 91 |
| NH$_4$Cl | 0 | 59 | 69 |
| | 0.1 | 79 | 85 |
| | 0.5 | 89 | 90 |
| | 1.0 | 93 | 95 |
| | 2.0 | 92 | 94 |
| | 5.0 | 93 | 92 |

As follows from Table 4, increased concentration of the additive above 1% does not result in a higher degree of catchng of phosphine and phosphorus particles. At a concentration of the additive of 0.1% and below, the absorption capacity of the solution is reduced. For this reason, optimal concentrations of said additives should be varied within the range of from 0.5 to 1% by weight.

EXAMPLE 6

This Example illustrates the possibility of utilization of the solid product as prepared in Example 1 hereinbefore as a modification and refining agent for hypereutectic silumines. The modification and refining process is carried out in the following manner. A hypereutectic silumine of the composition in percent by weight: silicon 20.0; copper 1.5; nickel 1.0; manganese 0.7; magnesium 0.3; aluminum the balance, taken in the amount of 220 kg is melted in a furnace and maintained at the temperature of 840°±10° C. Then 0.9 kg of the solid product, i.e. 0.4% by weight is added into the melt. Therewith, on the surface of the metal there is observed the formation of gas bubbles consisting of SiF$_4$, AlF$_3$ and AlCl$_3$ which refine the silumine. Completion of the refining process is determined by the discontinuation of evolution of gas bubbles. The thus-modified and refined silumine has been tested for its characteristics. There are measures tensile strength $\sigma$ (kgf/mm$^2$), elongation $\delta$ (%), Brinnel hardness HB (kgf/mm$^2$) and porosity—number of pores in 1 cm$^2$ of the surface. The results thus obtained are shown in Table 5 hereinbelow. Also shown in Table 5 are data obtained after addition of 1.32 kg (0.6% by weight) and 1.76 kg (0.8% by weight) of the solid product. For the purpose of comparison, shown in Table 5 are also the properties of hypereutectic silumine modified by means of a conventional modifying agent, i.e. copper phosphide Cu$_3$P of the "pure" grade containing 13.0% of phosphorus and 85.2% by weight of copper.

TABLE 5

Effect of the modifying agent on properties of a hypereutectic silumine

| No. Modifying agent, per cent by weight | Mechanical properties | | | Porosity Number of pores in cm$^2$ |
|---|---|---|---|---|
| | $\delta$ kg/mm$^2$ | $\delta$ % | HB kg/mm$^2$ | |
| 1. Solid product of Example 1: | | | | |
| 0.4 | 16 | 0.7 | 115 | 15 |
| 0.6 | 18 | 0.7 | 116 | 10 |
| 0.8 | 20 | 0.7 | 115 | 10 |
| 2. Copper phosphide | | | | |
| 0.4 | 14 | 0.5 | 110 | 20 |
| 0.6 | 15 | 0.5 | 110 | 20 |
| 0.8 | 16 | 0.5 | 110 | 20 |

From the data shown in the above Table 5 it follows that after processing of the hypereutectic silumine with the solid product obtained in accordance with the present invention, its mechanical strength is increased by 10-15%, percent of elongation is also increased, while gas porosity is reduced as compared with the data obtained with the use of $Cu_3P$. Metallographic analysis has shown that the size of grains of silicon in the hypereutectic silumine modified by the solid product of the present invention and by $Cu_3P$ is 10 to 20 mcm, while that of the non-modified silumine is 80 to 100 mcm. Taking into consideration the fact that the solid product according to the present invention is used without purification and that it has been prepared from wastes, production costs of the modified and refined product are reduced by 4-5 times.

EXAMPLE 7

This Example illustrates the opportunity of utilization of the solid product as prepared in Example 2 hereinbefore for the manufacture of a copper-phosphorus alloy therefrom. The solid product taken in the amount of 12.5 kg is brought into a crucible which is in turn placed into an apparatus provided with a pipe for admission and discharge of argon. The apparatus is placed into a furnace. The product is heated to the temperature of $1,100° \pm 50°$ C. The solid product is molten with evolution of $SiF_4$ which is entrained with the inert gas and absorbed by a solution of NaOH. No evolution of phosphorus vapours is observed. After cooling of the molten solid product two layers are formed, namely: the upper layer and the lower one. The upper one comprises a slag, while the lower layer is an alloy copper-phosphorus. The slag is separated from the casting. The casting of the alloy copper-phosphorus has its weight of 9.6 kg and consists of 84.1% by weight of copper and 10.7% by weight of phosphorus, impurities being the balance. The thus-produced alloy of copper and phosphorus can successfully replace the same alloy produced by other methods in all applications thereof (as a deoxidizing agent for copper alloys, as a component of copper solder). The thus-produced alloy of copper and phosphorus is well-castable. The slag after solidification has a glass-like appearance, it has a good adherence to metals and cleans them from oxides. For this reason it may be used as a flux for soldering or melting of non-ferrous metals.

EXAMPLE 8

This Example illustrates utilization of the liquid product as prepared in Example 2 hereinbefore for the preparation of a potassium-phosphorus fertilizer.

The liquid product collected in the vessel 9 and having the following composition: 75 g/l of $H_3PO_4$, 270 g/l of $H_2SO_4$, 190 g/l of $CuSO_4$ is adjusted to the content of $H_3PO_4$ of 110 g/l and that of $H_2SO_4$ of 620 g/l. Afterwards, the thus-prepared solution is passed into the vessel 10, into which under constant stirring Cottrell dust is portionwise added via the line "e" till a pulp is formed with a density of from 1.40 to 1.45. The Cottrell dust contains 25% of $P_2O_5$, 10% of $K_2O$ and 1% of phosphorus fines. Upon formation of the pulp, phosphorus particles which are entrained with the Cottrell dust are "neutralized" by the solution of copper sulphate with the formation of $Cu_3P$. Said pulp from vessel 10 is fed into a mixer 11, wherein it is mixed with phosphorite flour containing 22% by weight of $P_2O_5$ taken in the excess of 15% over its stoichiometric amount and which is supplied via the line "f". The resulting mass is delivered from the mixer 11 to a storage 12, wherein it is kept for maturation for 15 days under periodic agitation.

The degree of decomposition of phosphorite flour is as high as 92%. From the storage 12 the formed copper-containing potassium-phosphorus fertilizer is discharged via the line "g". The content of $P_2O_5$ in the resulting fertilizer is 32.5%; including the content of assimilated $P_2O_5$ equal to 30.1%; content of $K_2O$ is 3.5%, $Cu^{2+}$ 4.8% by weight. The thus-obtained fertilizer is a commercial product.

What is claimed is:

1. Method of modifying and refining hypereutectic silumines, which comprises melting a hypereutectic silumine at a temperature between about 820°-900° C. and adding thereto the solid product obtained by treating slime wastes or off-gases from the production of phosphorus with an aqueous solution of copper sulphate and separating the resulting solid product from the liquid product, said solid product containing mainly copper phosphide, chlorides and fluorides of alkali metals and silicon, and silicates of calcium and aluminum, whereby the copper phosphide reacts with the aluminum to form AlP seeds which serve as crystalization centers for silicon grains while the chlorides and fluorides of alkali metals and silicon are decomposed by the aluminum to form the corresponding aluminum and silicon fluorides and chlorides which evolve from the melt while the corresponding alkali metal fluorides and chlorides and silicon remain in the melt, the remaining components of said solid product surfacing from the melt as a slag, and recovering the thus modified and refined silumine.

2. A method as claimed in claim 1, wherein the solid product employed as a modifying and refining agent for hypereutectic silumines is used in an amount of from 0.4 to 0.8% by weight.

* * * * *